US012741522B2

(12) United States Patent
Eidmann et al.

(10) Patent No.: US 12,741,522 B2
(45) Date of Patent: Sep. 22, 2026

(54) FORM FIT OF A HOUSING OF A TRACTION BATTERY OF AN ELECTRIC VEHICLE WITH A CHASSIS OF THE ELECTRIC VEHICLE

(71) Applicant: AUDI AG, Ingolstadt (DE)

(72) Inventors: Florian Eidmann, Öhringen (DE); Andreas Gunesch, Untereisesheim (DE); Thomas Schmidt, Bad Rappenau (DE)

(73) Assignee: AUGI AG, Ingolstadt (DE)

( * ) Notice: Subject to any disclaimer, the term of this patent is extended or adjusted under 35 U.S.C. 154(b) by 565 days.

(21) Appl. No.: 18/183,754

(22) Filed: Mar. 14, 2023

(65) Prior Publication Data

US 2023/0294500 A1 Sep. 21, 2023

(30) Foreign Application Priority Data

Mar. 16, 2022 (DE) ..................... 10 2022 106 070.5

(51) Int. Cl.
*B60K 1/04* (2019.01)
*H01M 50/249* (2021.01)
*H01M 50/262* (2021.01)

(52) U.S. Cl.
CPC ............. *B60K 1/04* (2013.01); *H01M 50/249* (2021.01); *H01M 50/262* (2021.01); *H01M 2220/20* (2013.01)

(58) Field of Classification Search
CPC .............. B60K 1/04; B60K 2001/0438; B60K 2001/0466; B60K 2001/0472; H01M 50/249; H01M 50/262; B62D 25/20
See application file for complete search history.

(56) References Cited

U.S. PATENT DOCUMENTS

| | | | | |
|---|---|---|---|---|
| 9,120,371 B2 | | 9/2015 | Han et al. | |
| 9,358,864 B2 | * | 6/2016 | Meier | B60K 1/04 |
| 10,099,546 B2 | * | 10/2018 | Hara | B60K 1/04 |
| 10,622,740 B1 | * | 4/2020 | Kwon | H01M 50/249 |

(Continued)

FOREIGN PATENT DOCUMENTS

| | | |
|---|---|---|
| CN | 202174924 U | 3/2012 |
| CN | 103496314 A | 1/2014 |

(Continued)

OTHER PUBLICATIONS

Translation of DE 10 2016 222 824 (Year: 2018).*

(Continued)

*Primary Examiner* — Katy M Ebner
(74) *Attorney, Agent, or Firm* — Sterne, Kessler, Goldstein & Fox P.L.L.C.

(57) ABSTRACT

An electric vehicle includes a chassis and a housing for holding a traction battery of the electric vehicle. The chassis includes a beam having a projection protruding from the beam. The housing includes a lateral flange section protruding from the housing. The lateral flange section has a recess receiving the projection of the beam of the chassis. The recess of the lateral flange section defines a shape complementary to a shape of the projection of the beam such that the recess of the lateral flange section and the projection of the beam are brought into a form-fitting engagement. The recess and the projection collectively define a passage for receiving a screw.

14 Claims, 2 Drawing Sheets

(56) References Cited

U.S. PATENT DOCUMENTS

| | | | | |
|---|---|---|---|---|
| 11,820,219 | B2 * | 11/2023 | Ostertag | B62D 25/20 |
| 2012/0009008 | A1 * | 1/2012 | Hodoya | F16B 7/0446 403/188 |
| 2012/0321381 | A1 | 12/2012 | Ohgitani et al. | |
| 2013/0333967 | A1 * | 12/2013 | Meier | B60L 3/0007 180/68.5 |
| 2017/0174064 | A1 * | 6/2017 | Shinoda | B62D 21/02 |
| 2019/0276081 | A1 * | 9/2019 | Otoguro | B60K 1/04 |
| 2020/0070671 | A1 * | 3/2020 | Ohkuma | B60K 1/04 |
| 2021/0057691 | A1 * | 2/2021 | Xie | H01M 50/202 |
| 2021/0098761 | A1 * | 4/2021 | Montgomery | H01M 50/249 |
| 2021/0309090 | A1 * | 10/2021 | Övgård | B60K 1/04 |
| 2023/0242187 | A1 * | 8/2023 | Woo | B62D 24/00 |
| 2023/0347726 | A1 * | 11/2023 | Oishi | H01M 50/249 |
| 2023/0406085 | A1 * | 12/2023 | An | B60K 1/04 |
| 2024/0178500 | A1 * | 5/2024 | Shimizu | B60K 1/04 |
| 2024/0213602 | A1 * | 6/2024 | Nozoe | H01M 50/262 |
| 2024/0308321 | A1 * | 9/2024 | Ragot | H01M 50/249 |

FOREIGN PATENT DOCUMENTS

| | | | | |
|---|---|---|---|---|
| DE | 3150652 | A1 | 6/1983 | |
| DE | 102016222824 | B4 * | 6/2018 | H01M 50/204 |
| DE | 102017001123 | A1 | 8/2018 | |
| JP | 2012071764 | A | 4/2012 | |

OTHER PUBLICATIONS

Chinese Application No. 202310196334.X, Office Action mailed Mar. 26, 2026, with attached English Translation from EPO Global Dossier, 14 pages.

* cited by examiner

FORM FIT OF A HOUSING OF A TRACTION BATTERY OF AN ELECTRIC VEHICLE WITH A CHASSIS OF THE ELECTRIC VEHICLE

TECHNICAL FIELD

The present disclosure relates to a chassis for an electric vehicle, which comprises a beam, and a housing for a traction battery of an electric vehicle, which comprises a lateral flange section protruding from the housing. Furthermore, the present disclosure relates to a system for an electric vehicle which comprises a chassis of the electric vehicle and a housing for a traction battery of the electric vehicle, an electric vehicle, and a method for mounting a traction battery of an electric vehicle.

BACKGROUND

During each normal journey of a vehicle, i.e., a motor vehicle and, in particular, a passenger vehicle (car), the vehicle and with it each of its assemblies are exposed to many longitudinal accelerations, i.e., accelerations in a front-rear direction of the vehicle, and transverse accelerations, i.e., accelerations in a left-right direction of the vehicle. Accordingly, each assembly is subjected to a mass-proportional force during each acceleration of the vehicle.

For maintaining vehicle integrity, an arrangement of each assembly relative to the vehicle must be maintained under the effect of the force associated with acceleration. In other words, for each assembly of the vehicle, a vehicle holder must be provided which receives the acting force and keeps the assembly constantly at a given location relative to the vehicle.

The assemblies of a vehicle driven by an internal combustion engine include a fuel tank.

DE 10 2017 001 123 A1 therefore discloses a system for a vehicle which comprises a body part of the vehicle, a fuel tank of the vehicle, and a holder for the fuel tank. The holder comprises a projection which engages in a corresponding recess in the fuel tank and fixes the fuel tank between the body part and a cladding element of the holder.

Accordingly, a traction battery, which usually comprises a housing and a plurality of battery cells arranged in the housing, belongs to the assemblies of an electric vehicle. The housing can have a lateral flange section protruding from the housing. To fasten the traction battery to a chassis of the vehicle, the flange section is connected to a beam of the chassis by means of a plurality of screws.

Due to a large mass of the traction battery, a connection between the traction battery and the chassis, in particular in the event of a rear impact, e.g., from an accident, must absorb a large force. However, a possible number of screws may not be sufficient due to a mounting space that is limited in principle. Apart from this, stability of the screws cannot be ensured with sufficient safety against shearing, in particular in the event of a rear impact.

SUMMARY OF INVENTION

It is therefore an object of the embodiments of the present disclosure to provide a chassis for an electric vehicle and a housing of a traction battery of the electric vehicle which ensure a fixed connection between the chassis and the housing even in the event of a rear impact. Additional objects of the embodiments of the present disclosure are to propose a system comprising a chassis and a housing of a traction battery for an electric vehicle, and an electric vehicle, and to propose a method for mounting a traction battery of an electric vehicle.

An object of the embodiments of the present disclosure is a chassis for an electric vehicle which comprises a beam. The beam of the chassis is designed to absorb force arising in the event of a rear impact. In addition, the beam is provided for attaching a traction battery of the electric vehicle.

According to an embodiment of the present disclosure, the beam comprises a projection protruding from the beam, which projection is designed for a three-dimensional form fit with a corresponding recess in a housing of a traction battery of the electric vehicle. The projection is integrally formed on the beam and provided in order to fix the housing of the traction battery by means of a form-fitting engagement in the beam. The three-dimensional form fit causes the housing to be fixed to the beam in three spatial dimensions, i.e., in an x-direction (longitudinal direction of the vehicle), a y-direction (lateral transverse direction of the vehicle) and a z-direction (vertical transverse direction of the vehicle).

The connection provided by the engagement, i.e., the form-fitting engagement connection between the beam and the housing, can absorb a rear impact, i.e., a brief major acceleration in the longitudinal direction of the vehicle. On the other hand while mounting the traction battery in the chassis, the three-dimensional form fit makes it easy to position the traction battery relative to the chassis.

The projection preferably has an internal thread for a screw, and/or the projection is at least partially designed as a cone with a conical outer surface. The internal thread allows the housing to be screwed to the beam. In the event of a rear impact, the screws do not have to absorb the entire force acting in the longitudinal direction of the vehicle, since the form fit engagement connection likewise absorbs a portion of the force. As a result, the form fit engagement connection likewise counteracts a shearing of the screws.

The cone shape of the outer surface of the projection simultaneously allows the traction battery to be fixed in the vertical transverse direction of the vehicle and the traction battery to be fixed in the longitudinal direction and the horizontal transverse direction of the vehicle, thereby making it easier to mount the traction battery.

Advantageously, the beam is designed as a longitudinal beam of the chassis. The longitudinal beam is provided to absorb forces acting in the longitudinal direction of the vehicle.

Another embodiment of the present disclosure is a housing for a traction battery of an electric vehicle, which housing comprises a lateral flange section protruding from the housing. The flange section of the housing is designed to absorb a force arising in the event of a rear impact. In addition, the flange section is provided for fastening the traction battery to the chassis.

According to an embodiment of the present disclosure, the flange section has a recess formed in the flange section which is designed for a three-dimensional form fit with a corresponding projection of the chassis of the electric vehicle. The recess is integrally formed in the flange section and provided in order to fix the housing of the traction battery by means of a form fit engagement by the beam. The three-dimensional form fit causes the housing to be fixed to the beam in three spatial dimensions, i.e., in an x-direction (longitudinal direction of the vehicle), a y-direction (lateral transverse direction of the vehicle) and a z-direction (vertical transverse direction of the vehicle).

The recess preferably has a passage for a screw, and/or the recess is at least partially designed as a hollow cone with a conical inner surface. The passage allows the housing to be screwed to the beam. In the event of a rear impact, the screws do not have to absorb the entire force acting in the longitudinal direction of the vehicle, since the form fit engagement connection likewise absorbs a portion of the force. As a result, the form fit engagement connection likewise counteracts a shearing of the screws.

The cone shape of the inner surface of the recess simultaneously allows the traction battery to be fixed in the vertical transverse direction of the vehicle and the traction battery to be fixed in the longitudinal direction and the horizontal transverse direction of the vehicle, thereby making it easier to mount the traction battery.

In one embodiment, a hollow cylinder is integrally formed on the flange section, and the recess is formed in a free end of the hollow cylinder. A length of the hollow cylinder establishes a position of the traction battery relative to the chassis, i.e., a distance between the flange section and the beam, and allows a flexible positioning of the traction battery in the vertical transverse direction.

Another embodiment of the present disclosure is a system comprising a chassis and a housing for a traction battery. The system is designed to provide a connection between the chassis and the housing of the traction battery.

According to an embodiment of the present disclosure, the chassis is designed as a chassis according to the present disclosure, the housing is designed as a housing according to the present disclosure, and the system has a plurality of corresponding projections and recesses. The multiple corresponding projections and recesses distribute the force arising during a rear impact and correspondingly reduce the force acting on each individual form-fitting engagement of a projection and a recess. In this way, a fixed connection between the traction battery and the chassis is ensured.

Another embodiment of the present disclosure is an electric vehicle comprising a chassis and a housing for a traction battery which is held three-dimensionally on a beam of the chassis. Electric vehicles with a chassis and a housing for a traction battery that are held three-dimensionally on the chassis are widespread. Accordingly, the embodiments of the present disclosure have many varied implications.

According to the an embodiment of the present disclosure, the chassis is designed according to the present disclosure, the housing is designed according to the present disclosure, and a projection protruding from a beam of the chassis and a recess formed in a lateral flange section protruding from the housing are in a form-fitting engagement. The electric vehicle provides a fixed connection between the traction battery and the chassis, thereby increasing the safety of the electric vehicle in the event of a rear impact.

Another embodiment of the present disclosure is a method for mounting a traction battery of an electric vehicle, in which a housing surrounding a traction battery of an electric vehicle is mounted on a beam of a chassis of the electric vehicle. The mounting method is carried out in each production of an electric vehicle. Accordingly, the embodiments of the present disclosure have many varied implications.

According to an embodiment of the present disclosure, a projection protruding from the beam of the chassis and a recess formed in a lateral flange section protruding from the housing are brought into a form-fitting engagement. Thanks to the form-fitting engagement, the housing is fixed on the beam in three spatial dimensions, i.e., in an x-direction (longitudinal direction of the vehicle), a y-direction (lateral transverse direction of the vehicle) and a z-direction (vertical transverse direction of the vehicle), thereby making it easier to mount the traction battery.

A screw is preferably screwed through a passage in the recess into an internal thread of the projection. The screw connection further enhances the connection between the traction battery and the chassis and counteracts a movement of the traction battery relative to the chassis in the vertical transverse direction of the vehicle.

An essential advantage of the chassis according to the present disclosure and of the housing according to the present disclosure for a traction battery is that, in an interaction, they ensure a fixed connection between the chassis and the housing even in the event of a rear impact. A further advantage is that mounting the traction battery is facilitated.

BRIEF DESCRIPTION OF THE FIGURES

An embodiment of the invention is schematically illustrated in the drawings on the basis of one embodiment and described further with reference to the drawings. In the figure.

DETAILED DESCRIPTION

Figure 1:
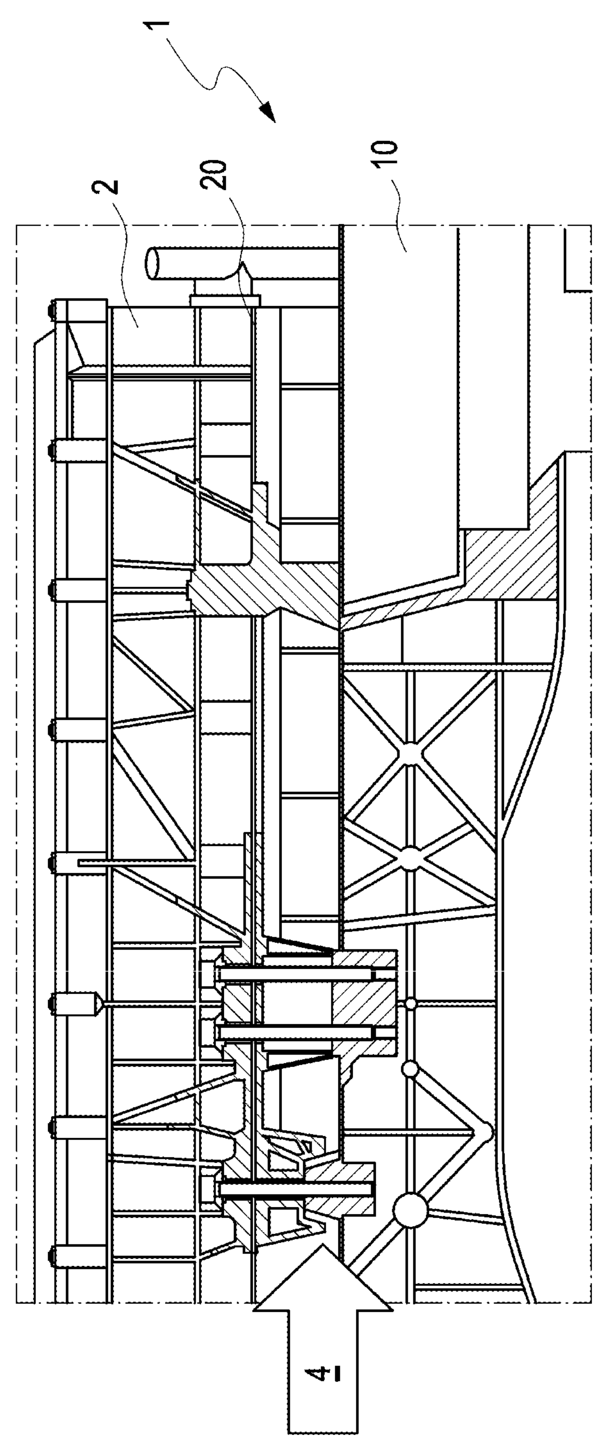
FIG. 1 shows is a partial side view of a system comprising a chassis and a housing of a traction battery according to one embodiment of the invention for an electric vehicle.

FIG. 1 shows a partial side view of a system according to one embodiment of the invention for an electric vehicle (not shown). The system comprises a chassis 1 with a beam 10 and a housing 2 for a traction battery which has a flange section 20. The chassis 1 and the housing 2 are suitable for the electric vehicle.

Figure 2:
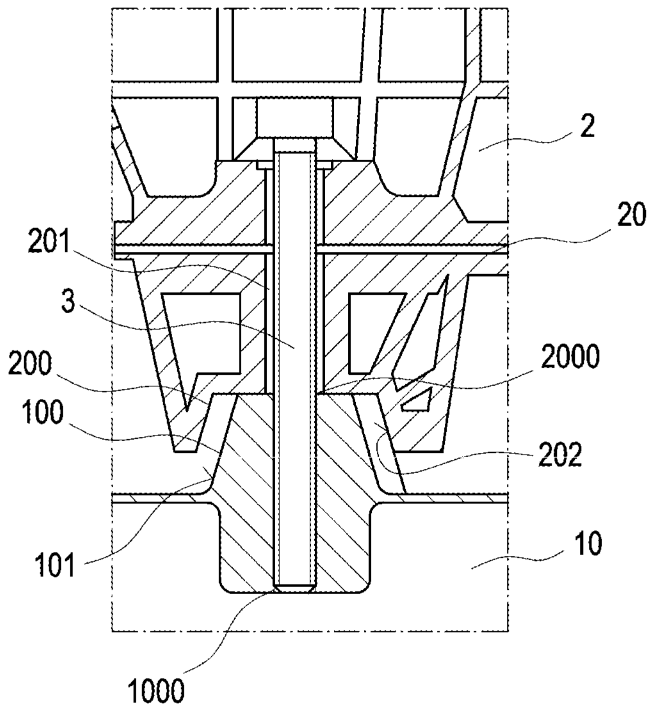
FIG. 2 shows an enlarged detail of the system shown in FIG. 1.

FIG. 2 shows an enlarged detail of the system shown in FIG. 1 with a connection according to an embodiment of the invention between the housing 2 and the beam 10.

The chassis 1 comprises a beam 10 with a projection 100 protruding from the beam 10. The beam 10 can be designed as a longitudinal beam of the chassis 1. The projection 100 is designed for a three-dimensional form fit with a corresponding recess 200 in the housing 2 of the traction battery of the electric vehicle. Ideally, the projection 100 has an internal thread 1000 for a screw 3. The projection 100 can be formed at least partially as a cone with a conical outer surface 101.

The housing 2 comprises a lateral flange section 20 protruding from the housing 2 with a recess 200 formed in the flange section 20. A hollow cylinder 201 can be formed on the flange section 20, and the recess 200 can be formed at a free end of the hollow cylinder 201. The recess 200 is designed for the three-dimensional form fit with the corresponding projection 100 of the chassis 1. The recess 200 ideally has a passage 2000 for the screw 3. The recess 200 can be formed at least partially as a hollow cone with a conical inner surface 202.

In advantageous embodiments, the system comprises a plurality of corresponding projections 100 and recesses 200.

The traction battery of the electric vehicle is mounted in a method as follows.

The housing 2 surrounding the traction battery of the electric vehicle is mounted on the beam 10 of the chassis 1 of the electric vehicle. For this purpose, each projection 100 protruding from the beam 10 of the chassis 1 and each recess 200 formed in a lateral flange section 20 protruding from the housing 2 are brought into a form-fitting engagement in pairs.

A screw 3 is ideally screwed into the internal thread 1000 of the corresponding projection 100 through each passage 2000 of the recess 200.

The electric vehicle comprises the chassis 1 and the housing 2. After being mounting as intended, the housing 2 is held three-dimensionally on the beam 10 of the chassis 1. The projection 100 protruding from the beam 10 of the chassis 1 and the recess 200 formed in the lateral flange section 20 protruding from the housing 2 are in a form-fitting engagement.

Figure 3:
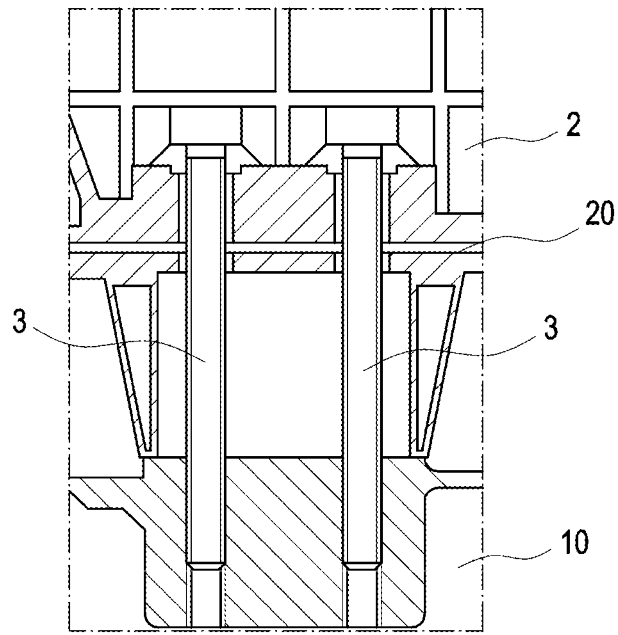
FIG. 3 shows a further enlarged detail of the system shown in FIG. 2.

FIG. 3 shows a further enlarged detail of the system shown in FIG. 2 with a connection between the housing 2 and the beam 10 belonging to the prior art.

As shown in FIG. 1, the system according to an embodiment of the invention can comprise both connections known from the prior art and connections according to an embodiment of the invention. The connections according to an embodiment of the invention can alternatively or additionally be provided on a cross beam of the chassis 1.

LIST OF REFERENCE NUMBERS

1 Chassis
10 Beam
100 Projection
101 Outer surface
1000 Internal thread
2 Housing
20 Flange section
200 Recess
201 Hollow cylinder
202 Inner surface
2000 Passage
3 Screw
4 Force in the event of rear impact

The invention claimed is:

1. A system for an electric vehicle system comprising:

a chassis comprising a beam having a projection protruding from the beam; and a housing comprising a lateral flange section protruding from the housing and a cylinder protruding downward from the lateral flange section, wherein the cylinder has a recess opening from a free end of the cylinder and receiving the projection of the beam of the chassis, and wherein the recess of the cylinder of the lateral flange section defines a shape complementary to a shape of the projection of the beam such that the recess of the cylinder of the lateral flange section and the projection of the beam are in a form-fitting engagement.

2. The system according to claim 1, wherein the projection has an internal thread for receiving a screw.

3. The system according to claim 1, wherein the projection is frustoconical-shaped such that the projection defines a conical outer side surface and a flat top surface.

4. The system according to claim 1, wherein the beam is a longitudinal beam of the chassis.

5. The system according to claim 1, wherein the recess defines a passage for receiving a screw.

6. The system according to claim 1, wherein the recess is frustoconical-shaped and defines a conical inner surface.

7. The system according to claim 1, wherein the projection is integrally formed on the beam.

8. An electric vehicle comprising:

a chassis comprising a beam having a projection protruding from the beam;

a traction battery; and a housing coupled to the beam of the chassis, the housing holding the traction battery and comprising a lateral flange section protruding from the housing and a cylinder protruding downward from the lateral flange section, wherein the cylinder has a recess opening from a free end of the cylinder and receiving the projection of the beam of the chassis, and wherein the recess of the cylinder of the lateral flange section defines a shape complementary to a shape of the projection of the beam such that the recess of the cylinder of the lateral flange section and the projection of the beam are brought into a form-fitting engagement.

9. The electric vehicle according to claim 8, wherein the projection has an internal thread for receiving a screw.

10. The electric vehicle according to claim 8, wherein the projection is frustoconical-shaped and defines a conical outer surface.

11. The electric vehicle according to claim 8, wherein the beam is a longitudinal beam of the chassis.

12. The electric vehicle according to claim 8, wherein the recess defines a passage for receiving a screw.

13. The electric vehicle according to claim 8, wherein the recess is frustoconical-shaped and defines a conical inner surface.

14. The electric vehicle according to claim 8, wherein the projection is integrally formed on the beam.

* * * * *